Feb. 1, 1966     N. C. KOESTER     3,232,314
RELIEF VALVE
Filed Dec. 26, 1961
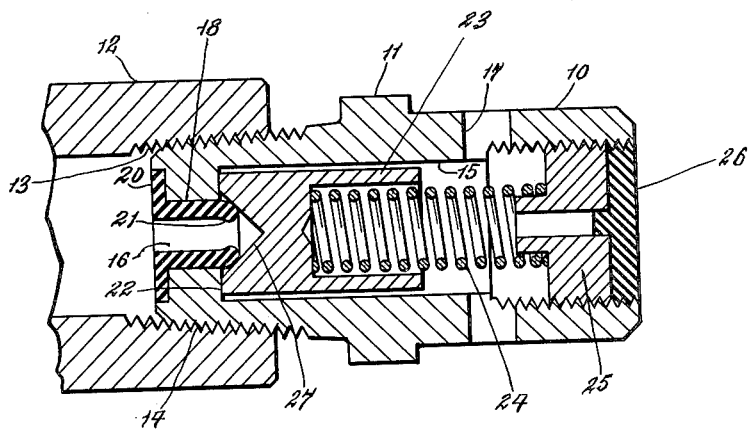
Fig. 1.
Fig. 2.
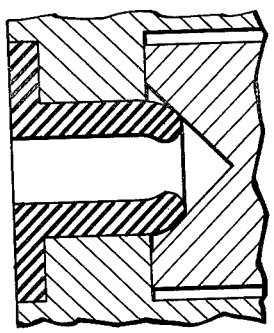
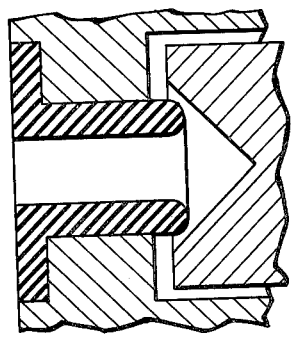
Fig. 3.
Fig. 4.
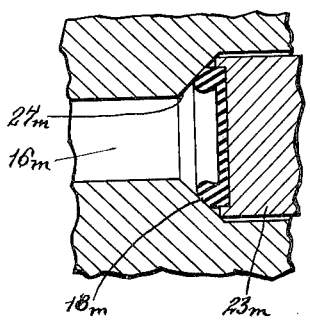
INVENTOR
Norman C. Koester
BY Walter H. Popp.
ATTORNEY

United States Patent Office 3,232,314
Patented Feb. 1, 1966

3,232,314
RELIEF VALVE
Norman C. Koester, Lancaster, N.Y., assignor to
Scott Aviation Corporation, Lancaster, N.Y.
Filed Dec. 26, 1961, Ser. No. 161,951
1 Claim. (Cl. 137—516.29)

This invention relates to a safety valve or relief valve which is adapted to be tubularly connected to a container, and is adapted to relieve the excess pressure in said container when the pressure therein rises to a point above which it is desired the pressure will not be allowed to rise.

The principal object of the invention is to provide a relief valve which will invariably and accurately open when the pressure to which it is subjected rises to a specific maximum pressure, and, also, will close invariably and accurately when the pressure thereafter drops to a pressure which is only slightly lower than the pressure at which it opened.

Other collateral objects of the invention and practical solutions thereof are disclosed in the following specification and illustrated in the accompanying drawing, wherein:

FIG. 1 is a medial, longitudinal section through one form of my invention.

FIG. 2 is an enlarged, fragmentary section of the most vital working parts of FIG. 1, showing the relief valve (as in FIG. 1) in its *closed* position.

FIG. 3 is an enlarged, fragmentary section similar to FIG. 2, but showing the relief valve in its *open* position.

FIG. 4 is a medial, fragmentary section analagous to FIG. 2, but showing a modified form of the invention.

This invention will be described, for efficiency, exactly as it is illustrated, but it is to be understood that the legal breadth of the invention is to be measured solely by its inherent patentable novelty and by the scope of its appended claim.

FIGS. 1-3

The casing 10 is of generally tubular form and is preferably provided, intermediate its length, with an enlarged, hexagonal portion 11 to permit its easy engagement with a wrench so as to be tightly screwed into a boiler 12 or other container which may be subjected to excessive internal p.s.i.'s. For this purpose the boiler 12 is provided with a female pipe thread 13, while the casing 10 is provided with the male pipe thread 14.

Said casing 10 is provided with an axial, cylindrical bore 15 which extends between an inlet 16 and a plurality of outlets 17, the latter positioned outside of the boiler 12.

Suitably arranged in the inlet end of the casing 10 is a tubular valve probe 18 having a laterally-projecting, securing flange 20, and having its engaging (right) end 21 projecting some distance outwardly (to the right) beyond the transverse, supporting wall 22 of the casing 10. The distal or engaging end 21 of said valve probe 18 is preferably rounded, as best shown in FIG. 3.

Slidably arranged in the cylindrical bore 15 of the casing 10 is a valve body 23 which is of hexagonal or other similar cross section (with the corners suitably rounded), and is resiliently urged towards its closed position (as in FIGS. 1 and 2) by a compression helical spring 24. The latter is factory-adjusted, as to compression, by a screw head 25 which is screwed into the distal end of the casing 10 and any accidental change in this adjustment then prevented by applying a quantity of tar 26. The left or engaging end of this slidable valve body 23 is countersunk to form a conical valve-seat 27.

Operation

When the present invention (the relief valve) is in its closed position, as it is in FIGS. 1 and 2, the unit pressure in the boiler 12 is not solely directed longitudinally of the axis of the relief valve, but a considerable portion of said pressure is directed obliquely, that is, perpendicularly, of the conical surface of the conical valve-seat 27. This provides a closing seal which is effectively leakproof at high pressures, and also enables the relief valve to open more precisely at the exact pressure at which it should open. Because of this oblique fluid pressure, it has also been found in actual practice that the present invention also shuts off at a pressure only slightly below its opening pressure.

FIG. 4

FIG. 4 is similar to FIGS. 1 and 3 except that its flexible, tubular, valve probe $18_m$ is arranged on the valve body $23_m$, while the conical valve-seat $27_m$ is formed at the inner end of the inlet $16_m$ of the casing $10_m$.

I claim:

A relief valve adapted to open at a definite pressure and to close at a definite only slightly lower pressure comprising, in combination, a casing having a bore, an inlet, an outlet, and a transverse wall in said bore adjacent said inlet; a resilient, tubular valve probe arranged longitudinally in said casing adjacent said inlet and having an engaging end of generally cylindrical external wall form projecting into said bore beyond said transverse wall; a valve body slidable in said casing bore into and out of engagement against said wall, said body having an end engageable with said wall and a conical valve-seat in said end opening toward said probe end, spring means urging said body end against said wall, said seat engaging said tubular valve probe end prior to engagement of said valve body end against said wall and tapering across said valve probe end in a manner distorting said valve probe end laterally inwardly to close said valve when said valve body end is engaged against said wall.

References Cited by the Examiner

UNITED STATES PATENTS

| | | | |
|---|---|---|---|
| 1,000,799 | 8/1911 | Grimes | 251—332 X |
| 2,585,863 | 2/1952 | Smith | 137—469 X |
| 2,683,464 | 7/1954 | St. Clair | 251—175 |
| 2,684,830 | 7/1954 | Stephany | 251—333 |
| 2,976,010 | 3/1961 | Huthsing | 251—333 |
| 2,991,972 | 7/1961 | Busby | 251—175 |
| 3,027,134 | 3/1962 | Nichols | 251—175 |

FOREIGN PATENTS

| | | |
|---|---|---|
| 580,166 | 7/1959 | Canada. |
| 1,245,197 | 9/1960 | France. |

M. CARY NELSON, *Primary Examiner.*

ISADOR WEIL, MARTIN P. SCHWADRON,
*Examiners.*